Patented May 26, 1931

1,806,995

UNITED STATES PATENT OFFICE

WILHELM FITZKY AND ERWIN THOMA, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

AZO-DYESTUFFS INSOLUBLE IN WATER

No Drawing. Application filed April 17, 1930, Serial No. 445,195, and in Germany February 18, 1929.

The present invention relates to new azo dyestuffs which are insoluble in water and yield valuable pigment dyes or fast dyeings and printings when prepared on the fiber.

More particularly our invention relates to the dyestuffs of the following general formula:

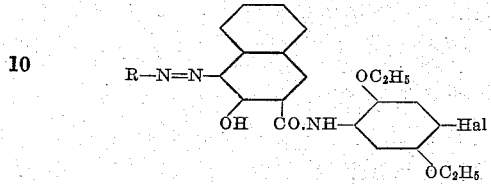

wherein R stands for an aromatic nucleous which is free from any group which would render the dyestuff water-soluble, R is intended to represent especially phenyl nuclei which are free from carboxylic or sulfonic acid groups and may be substituted by such groups as chlorine or methyl. Our dye-stuffs are obtainable by coupling a 2'.3'-hydroxynaphthoyl-2-amino-5-halogen-hydroquinone-diethylether with a diazotized aromatic base which is free from any group rendering the dyestuff water-soluble.

The new dyestuffs show better properties of fastness especially to light than those prepared from 2-hydroxy-3-naphthoylaminohydroquinone-dimethylether described in U. S. Patent No. 1,457,114. Some of the new dyestuffs produced by our present invention are also distinguished by a considerable fastness to bucking.

The following examples illustrate the invention, but they are not intended to limit it thereto:

1. Well boiled and dried cotton yarn is impregnated with a solution containing per liter 5 grams of 2'.3'-hydroxynaphthoyl-2-amino-5-chloro-hydroquinone-diethylether, 10 cc. of Turkey red oil of 50% strength and 20 cc. of caustic soda solution of 40% strength. The yarn thus treated is well wrung out and developed with a diazo solution prepared as follows:

To 2 grams of hydrochloride of 1-amino-2-methyl-3-chlor-benzene, 1.6 cc. of hydrochloric acid of 35% strength, and 0.72 gram of sodium nitrite there are added 2 grams of sodium acetate and the whole is made up with water to 1 liter. The material is then rinsed and soaped boiling hot. In this manner a yellowish red of very good fastness to light and to boiling lye is obtained. The dyestuff has the probable following constitution:

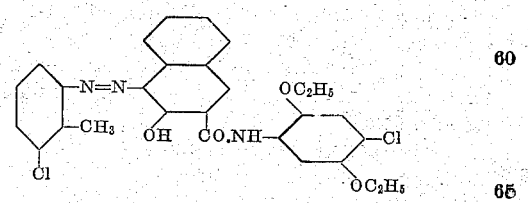

2. By developing the cotton yarn impregnated as described in Example 1 with a diazo solution prepared from 1.6 gram of 2.5-dichloraniline, there is obtained an orange brown dyeing of very good fastness to light and to boiling lye. The dyestuff thus produced has the following probable constitution:

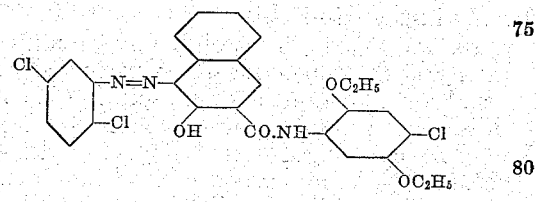

3. By using a diazo solution of 2 grams of hydrochloride of 1-amino-2-methyl-5-chlorobenzene, there is obtained a yellowish red dyeing of very good fastness to light and to boiling lye. The dyestuff thus produced has the following probable constitution:

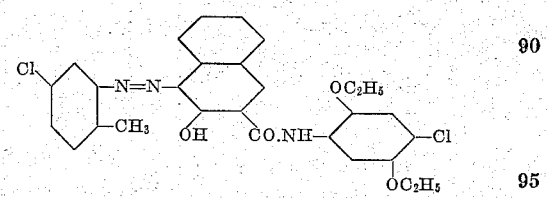

4. By using a diazo solution prepared from 1.7 gram of 1-amino-4-methyl-2.5-dichlorobenzene there is obtained a brick red dyeing of very good fastness to light and to boiling lye. The dyestuff has the following probable constitution:

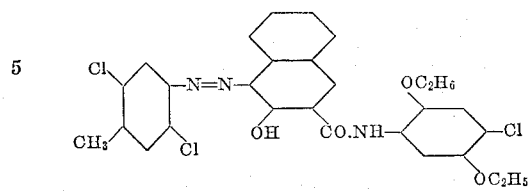

5. By using a diazo solution prepared from 1.7 gram of 1-amino-3-methyl-4.6-dichlorobenzene there is obtained a brown-red dyeing of very good fastness to light and to boiling lye. The dyestuffs have the following probable constitution:

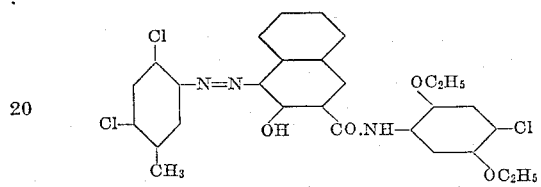

6. By using 1-amino-3.5-dimethyl-4-chlorobenzene as diazo-component there is obtained on the fiber a Turkey red dyeing of excellent fastness to light and very good fastness to bucking.

7. By using 1-amino-3.5-dimethyl-2-chlorobenzene as diazo-component there is obtained a bluish red dyeing of excellent fastness to light.

8. By using 1-amino-2.5-dimethoxy-4-chlorobenzene as diazo-component there is obtained a bordeaux red dyeing of excellent fastness to light.

9. By using 1-amino-2.4-dimethoxy-5-chlorobenzene as diazo-component there is obtained a bordeaux red dyeing of extraordinary fastness to light.

10. 14.2 parts by weight of 1-amino-2-methyl-5-chlorobenzene are diazotized in the usual manner and the diazo solution is combined with a solution of 40.5 parts by weight of 2'-hydroxy-3'-naphthoyl-2-amino-5-chloro-1.4-diethoxybenzene in a dilute caustic soda solution, rinsed with Turkey red oil and an amount of sodium acetate sufficient for binding the excess of the mineral acid. The precipitated dyestuff is filtered off and well washed. It corresponds to the formula:

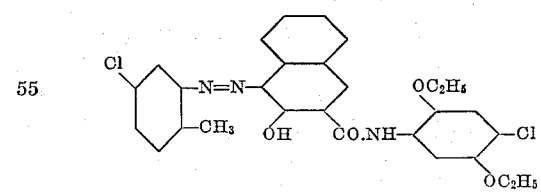

It represents when dry a red powder soluble in concentrated sulfuric acid with a wine red tint. It yields when treated with substrata, in the usual manner, advantageously in the form of a paste, red lakes of very good fastness to light.

The expression "free from any group capable of rendering the dyestuff water-soluble" is meant to exclude such groups as, for instance, the sulfonic acid or carboxylic acid group. By the term "aromatic nucleus" in claim 1, we mean aromatic nuclei of the benzene and napthalene series.

We claim:

1. As new compounds, the azo dyestuffs of the following constitution:

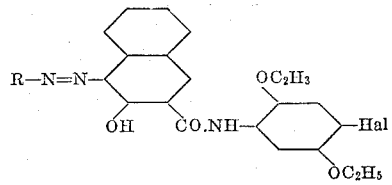

wherein R stands for an aromatic nucleus which is free from any group capable of rendering the dyestuff water-soluble which compounds are when dry colored powders, insoluble in water, yielding when mixed with substrata valuable color lakes and when prepared on the fiber dyeings and printings of very good fastness properties, especially to light.

2. As new compounds, the azo dyestuffs of the following constitution:

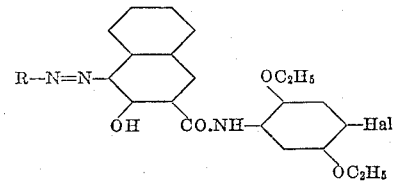

wherein R stands for a phenyl nucleus which is free from any group capable of rendering the dyestuff water-soluble which compounds are when dry colored powders, insoluble in water, yielding when mixed with substrata valuable color lakes and when prepared on the fiber dyeings and printings of very good fastness properties, especially to light.

3. As new compounds, the azo dyestuffs of the following constitution:

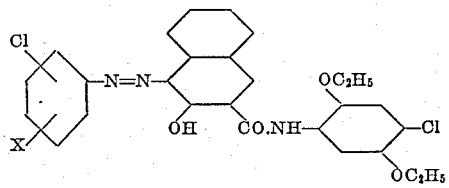

wherein X stands for hydrogen or a methyl group and Cl represents 1 or 2 atoms of chlorine which compounds are when dry colored powders, insoluble in water, yielding when mixed with substrata valuable color lakes and when prepared on the fiber dyeings and printings of very good fastness properties, especially to light.

4. As new compounds, the azo dyestuffs of the following constitution:

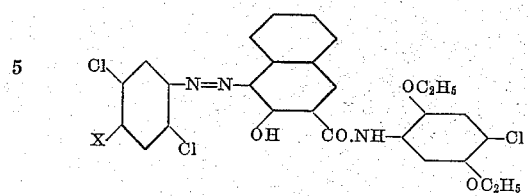

wherein X stands for hydrogen or a methyl group which compounds are when dry colored powders, insoluble in water, yielding when mixed with substrata valuable color lakes and when prepared on the fiber orange-brown to brick-red dyeings and printings of very good fastness properties, especially to light.

5. As a new compound, the azo dyestuff of the following constitution:

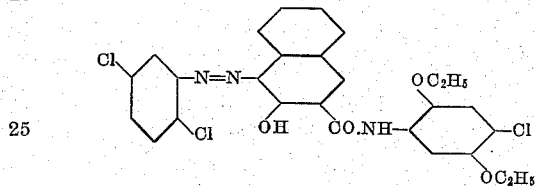

said compound being when dry a colored powder, insoluble in water, yielding when mixed with substrata valuable color lakes and when prepared on the fiber orange-brown dyeings and printings of very good fastness properties especially to light.

In testimony whereof, we affix our signatures.

WILHELM FITZKY.
ERWIN THOMA.